United States Patent [19]
Greenwood

[11] 3,853,521
[45] Dec. 10, 1974

[54] METHOD FOR MAKING GLASS OPTICAL FIBRE PREFORM

[75] Inventor: John Christopher Greenwood, Harlow, England

[73] Assignee: International Standard Electric Corporation, New York, N.Y.

[22] Filed: Mar. 18, 1974

[21] Appl. No.: 452,020

[30] Foreign Application Priority Data
Mar. 29, 1973 Great Britain................15096/73

[52] U.S. Cl.................... 65/71, 65/DIG. 7, 65/13, 264/311
[51] Int. Cl............................................ C03b 19/04
[58] Field of Search...... 65/1, 2, 13, 71, 83, DIG. 7; 264/311

[56] References Cited
UNITED STATES PATENTS

| | | | |
|---|---|---|---|
| 3,083,552 | 4/1963 | Carlson et al...................... | 65/71 X |
| 3,607,163 | 9/1971 | Smith et al............................... | 65/1 |
| 3,754,879 | 8/1973 | Phaneuf........................... | 65/DIG. 7 |
| 3,775,075 | 11/1973 | Keck et al....................... | 65/DIG. 7 |

*Primary Examiner*—Robert L. Lindsay, Jr.
*Attorney, Agent, or Firm*—John T. O'Halloran; Menotti J. Lombardi, Jr.; Edward Goldberg

[57] ABSTRACT

A preform for later use in drawing optical fibres is made from an outer tube of cladding glass by spinning molten glass in a mold about a horizontal axis. As the mold is cooled, a lower specific gravity high refractive index core glass is inserted into the bore of the cladding glass tube. The mold is again centrifuged, heated to melt the two glasses and cooled to stabilize the glass interface and promote diffusion. The required relationship between specific gravities and refractive indices is obtained by using similar glass compositions. The core glass may contain calcium oxide and sodium oxide while the cladding glass includes barium oxide and potassium oxide.

5 Claims, No Drawings

3,853,521

METHOD FOR MAKING GLASS OPTICAL FIBRE PREFORM

FIELD OF THE INVENTION

This invention relates to the manufacture of optical fibre preforms for eventual drawing down into optical fibre and particularly to a novel method employing molten glass in a centrifuged mold.

SUMMARY OF THE INVENTION

According to the invention there is provided a method of making an optical fibre preform, in preparation for later drawing down into an optical fibre, including the steps of introducing molten cladding glass into a cylindrical mold, forming a tube of cladding glass by spinning the mold about its axis held horizontal while the glass is molten, then, as it is cooled below its softening point, introducing sufficient core glass into the bore of the tube of cladding glass to fill it, the core glass having a smaller specific gravity and larger refractive index than the cladding glass, spinning the mold about its axis held horizontal while taking it through a thermal cycle to melt both the glasses, and then cooling them below their softening points.

One preferred way of providing the required relationship between the refractive indices and specific gravities of the core and cladding glasses is to use substantially the same composition for both glasses. Thus the core glass may contain calcium oxide at least a proportion of which is replaced by barium oxide in formulating the cladding glass. This substitution may result in the cladding glass having a higher softening point than the core glass. If the difference in softening points becomes great enough to be troublesome it can be reduced by the use of sodium oxide in the core glass and by replacing at least a proportion of this sodium oxide with potassium oxide in the formulation of the cladding glass.

There follows a description of the manufacture of an optical fibre preform embodying the invention in a preferred form.

DESCRIPTION OF THE PREFERRED EMBODIMENT

Molten cladding glass having the composition 24% by weight of $Na_2O$, 6% BaO, and 70% $SiO_2$ is poured into a cylindrical mold to nearly fill it. A cap is fitted to the top of the mold which is then placed with its axis horizontal in a furnace and rotated at high speed about its axis. Initially the furnace is kept at a temperature of about 800°C sufficient to ensure mobility of the glass so that the rapid spinning of the mold causes the glass to form by centrifugal action a tube with a uniform bore. The temperature of the furnace is then lowered by about 200°C so as to bring the glass beneath its softening point. Next the rotation of the mold is halted, it is taken out of the furnace, and the bore of the tube of cladding glass within it is filled with molten core glass. The core glass has the composition 24% by weight of $Na_2O$, 6% by weight CaO, and 70% by weight $SiO_2$. The mold cap is refitted, the mold is returned to the furnace and then once again rotated at high speed about its axis held horizontal. The furnace is taken through a thermal cycle which first melts both glasses so that the position of the interface between the glasses is stabilized by centrifugal action, and then the glasses are cooled to below their softening points before the rotational drive is removed. If necessary, the difference in softening points between core and cladding can be reduced by replacing a proportion of the sodium oxide of the cladding glass with potassium oxide.

If desired, interdiffusion between the glasses may be promoted during this heating cycle by prolonging the time for which the glasses are retained in a molten state. One effect of interdiffusion is that in a single mode fibre the proportion of optical energy conveyed in the vicinity of the mechanical boundary between the glasses is reduced. It is here that there are liable to be the greatest density of impurities contributing to optical loss, and hence interdiffusion can in certain circumstances reduce the optical attenuation of the resulting fibre.

It is to be understood that the foregoing description of specific examples of this invention is made by way of example only and is not to be considered as a limitation on its scope.

What is claimed is:

1. A method of making an optical fibre preform for later drawing down into an optical fibre, including the steps of introducing molten cladding glass into a cylindrical mold, forming a tube of cladding glass by spinning the mold about its axis held horizontal while the glass is molten, cooling the glass below its softening point, introducing sufficient core glass into the bore of the tube of cladding glass to fill it, the core glass having a smaller specific gravity and larger refractive index than the cladding glass, and spinning the mold about its axis held horizontal while taking it through a thermal cycle to melt both the glasses and then cool them below their softening points.

2. The method of claim 1, wherein the spinning mold is heated in a furnace maintained at about 800°C to cause the cladding glass to form a tube with a uniform bore, thereafter the furnace temperature is lowered by about 200°C to cool the glass below the softening point and including halting the rotation of the mold and taking the mold out to fill the bore of the tube with molten core glass, returning the mold to the furnace, and rotating the mold again to melt both glasses to stabilize the position of the interface therebetween before cooling again and removing the rotational drive.

3. The method of claim 2, wherein a constituent of the core glass is calcium oxide and the composition of the cladding glass is substantially the same as that of the core glass with the difference that barium oxide is substituted for a proportion of the calcium oxide.

4. The method of claim 2, wherein a constituent of the core glass is sodium oxide and the composition of the cladding glass also differs from that of the core glass in that potassium oxide is substituted for a proportion of the sodium oxide.

5. The method of claim 3, wherein said cladding glass is of a composition including 24% by weight of $Na_2O$, 6% of BaO and 70% $SiO_2$ and the core glass is of a composition including 24% by weight of $Na_2O$, 6% of CaO and 70% of $SiO_2$.

* * * * *